(12) United States Patent
Wilensky

(10) Patent No.: US 7,783,127 B1
(45) Date of Patent: *Aug. 24, 2010

(54) DETERMINING PARAMETERS FOR ADJUSTING IMAGES

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/273,522

(22) Filed: Nov. 18, 2008

Related U.S. Application Data

(63) Continuation of application No. 10/678,423, filed on Oct. 3, 2003, now Pat. No. 7,466,868.

(51) Int. Cl.
*G06K 9/40* (2006.01)
*G06K 9/00* (2006.01)
(52) U.S. Cl. .................................. 382/274; 382/169
(58) Field of Classification Search ......... 382/168–172, 382/254–275
See application file for complete search history.

(56) References Cited

U.S. PATENT DOCUMENTS

| 5,446,504 | A | | 8/1995 | Wada |
| 5,495,428 | A | | 2/1996 | Schwartz |
| 5,727,080 | A | * | 3/1998 | Cox et al. ............... 382/168 |
| 5,793,886 | A | * | 8/1998 | Cok ....................... 382/169 |
| 5,818,975 | A | | 10/1998 | Goodwin et al. |
| 5,982,947 | A | | 11/1999 | Hayashi |
| 6,061,091 | A | | 5/2000 | Van de Poel et al. |
| 6,181,815 | B1 | | 1/2001 | Marugame |
| 6,191,823 | B1 | | 2/2001 | Ahn |
| 6,204,858 | B1 | | 3/2001 | Gupta |
| 6,263,101 | B1 | | 7/2001 | Klein |
| 6,337,925 | B1 | | 1/2002 | Cohen et al. |
| 6,392,764 | B1 | | 5/2002 | Eschbach et al. |
| 6,417,891 | B1 | | 7/2002 | Cacciatore et al. |
| 6,438,264 | B1 | | 8/2002 | Gallagher et al. |
| 6,453,068 | B1 | | 9/2002 | Li |
| 6,493,468 | B1 | | 12/2002 | Matsuura |
| 6,552,731 | B1 | | 4/2003 | Gonsalves |

(Continued)

FOREIGN PATENT DOCUMENTS

WO    WO2006/028460    3/2006

OTHER PUBLICATIONS

Gonzalez et al., "Digital Image Processing", Prentice Hall, 2001, pp. 94-103.*

(Continued)

*Primary Examiner*—Bhavesh M Mehta
*Assistant Examiner*—Sean Motsinger
(74) *Attorney, Agent, or Firm*—Fish & Richardson P.C.

(57) ABSTRACT

Methods and apparatus, including computer program products, for determining parameter values for adjusting an image. A first function of a local attribute is specified based on values of the local attribute in the image. A second function of the local attribute is specified based on an image adjustment depending upon an adjustment parameter. An object function value is calculated for each of two or more values of the adjustment parameter, each object function value including accumulated differences between the first and second function at multiple values of the local attribute. Based on the calculated object function values, a value of the adjustment parameter is determined for adjusting the image.

19 Claims, 4 Drawing Sheets

U.S. PATENT DOCUMENTS

| | | | |
|---|---|---|---|
| 6,594,384 B1 | 7/2003 | Kim et al. | |
| 6,621,937 B1 | 9/2003 | Adams et al. | |
| 6,650,774 B1 | 11/2003 | Szeliski | |
| 6,728,421 B2 | 4/2004 | Kokemohr | |
| 6,792,160 B2 | 9/2004 | Shaw et al. | |
| 6,813,335 B2 | 11/2004 | Shinbata | |
| 6,819,794 B2 | 11/2004 | Inoue | |
| 6,822,762 B2 | 11/2004 | Moroney et al. | |
| 6,856,704 B1 | 2/2005 | Gallagher et al. | |
| 6,954,288 B2 | 10/2005 | Uekusa et al. | |
| 6,954,549 B2 | 10/2005 | Kraft | |
| 6,961,066 B2 | 11/2005 | James | |
| 7,020,332 B2 | 3/2006 | Nenonen | |
| 7,031,547 B2 | 4/2006 | Kokemohr | |
| 7,038,810 B1 | 5/2006 | Yamazoe et al. | |
| 7,057,768 B2 | 6/2006 | Zaklika | |
| 7,068,841 B2 | 6/2006 | Luo | |
| 7,071,948 B2 | 7/2006 | Wilensky | |
| 7,082,211 B2 | 7/2006 | Simon et al. | |
| 7,092,573 B2 | 8/2006 | Luo et al. | |
| 7,106,900 B2 | 9/2006 | Park et al. | |
| 7,113,648 B1 | 9/2006 | Aihara | |
| 7,121,469 B2 | 10/2006 | Dorai et al. | |
| 7,127,108 B2 | 10/2006 | Kinjo et al. | |
| 7,130,463 B1 | 10/2006 | Spangler | |
| 7,133,553 B2 | 11/2006 | Embler | |
| 7,142,724 B2 * | 11/2006 | Oh et al. | 382/274 |
| 7,466,868 B2 | 12/2008 | Wilensky | |
| 2002/0141640 A1 | 10/2002 | Kraft | |
| 2002/0186387 A1 | 12/2002 | Moroney et al. | |
| 2003/0001856 A1 | 1/2003 | Sawada et al. | |
| 2003/0016881 A1 | 1/2003 | Matsuura | |
| 2003/0021488 A1 | 1/2003 | Shaw et al. | |
| 2003/0099411 A1 | 5/2003 | Kokemohr | |
| 2003/0131237 A1 | 7/2003 | Ameline et al. | |
| 2003/0174887 A1 * | 9/2003 | Oh et al. | 382/168 |
| 2003/0234960 A1 | 12/2003 | Kaltenbach et al. | |
| 2004/0125983 A1 | 7/2004 | Reed et al. | |
| 2005/0100242 A1 | 5/2005 | Trifonov et al. | |
| 2006/0193515 A1 | 8/2006 | Kim et al. | |

OTHER PUBLICATIONS

Chang et al., "Optimal Histogram Matching by Monotone Gray Level Transformation", Communications of the ACM USA, Oct. 1978, vol. 21, No. 10, pp. 835-840 "DIGITAL SHO Plug-in", http://www.asf.com/products/plugins/sho/pluginSHO.asp, 2001-2003,.*

"Adjusting Brightness and Contrast", http://support2.epson.net/manuals/english/scanner/perfection2450photo/REF_G/OPTMZ_2.HTM, Version 1.00E, 2002, Seiko Epson Corporation, 11 pages.

Arthur R. Weeks, Jr., *Fundamentals of Electronic Image Processing*, SPIE Optical Engineering Press, USA, 1996, Chapter 3, pp. 90-120.

Chang et al., "Optimal Histogram Matching by Monotone Gray Level Transformation", *Communications of the ACM USA*, Oct. 1978, vol. 21, No. 10, pp. 835-840.

"DIGITAL SHO Plug-In", http://www.asf.com/products/plugins/sho/pluginSHO.asp, 2001-2003, Eastman Kodak Company, 2 pages.

Fraser, "Out of Gamut: Don't Underestimate Photoshop's Auto Color", http://www.creativepro.com/story/feature/17164.html, Jul. 23, 2002, Creativepro.com, 12 pages.

Gonzalez et al., "Digital Image Processing", Prentice Hall, 2001, pp. 94-103.

Gregory Ward Larson, et al, "A Visibility Matching Tone Reproduction Operator for High Dynamic Range Scenes," IEEE Transactions on Visualization and Computer Graphics, vol. 3, No. 4, Oct.-Dec. 1997, pp. 291-306.

"Highlight Midtone and Shadow", http://www.caisse.com.au/pituts/hmsarticle/hms01.htm, 2003, Caisse, 11 pages.

J. Tumblin and H. Rushmeier, "Tone Reproduction for Realistic Images," IEEE Computer Graphics and Applications, Nov. 1993, 13(6), 42-48.

King, "Two Adaptive Neural Networks for Image Histogram Processing", *Proceedings to the 1995 International Symposium on Artificial Neural Networks*, 1995, Obtained from the Internet at www.cse.cuhk.edu.hk/~king/PUB/isann95.ps> 6 pages.

Leszczynski, Konrad et al., "The enhanced of radiotherapy verification images by an automated edge detection technique." Med. Phys. 19(3), May/Jun. 1992, pp. 611-621.

Pizer, Stephen et al., "Adaptive Grey Level Assignment in CT Scan Display," Journal of Computer Assisted Tomography, Apr. 1984, pp. 300-305.

Pizer, Stephen et al., "Adaptive Histogram Equalization and its Variations," Computer Vision, Graphics, and Image Processing, 39, pp. 355-368 (1987).

"Single Click Fixes in Photoshop Album", http://www.dummies.com/WileyCDA/DummiesArticle/id-2039.html, Adapted from Photoshop Album for Dummies, Wiley Publishing, Inc., Jul. 2003, 6 pages.

"Using Adobe Photoshop's "Auto Contrast" Feature", http://www.lonestardigital.com/autocontrast.htm, Copied from Adobe Magazine/May-Jun. 2000, 5 pages.

Zia-ur Rahman, "A Multiscale Retinex for Color Rendition and Dynamic Range Compression," SPIE International Symposium on AeroSense, Visual Information Processing IX, Apr. 2000.

* cited by examiner

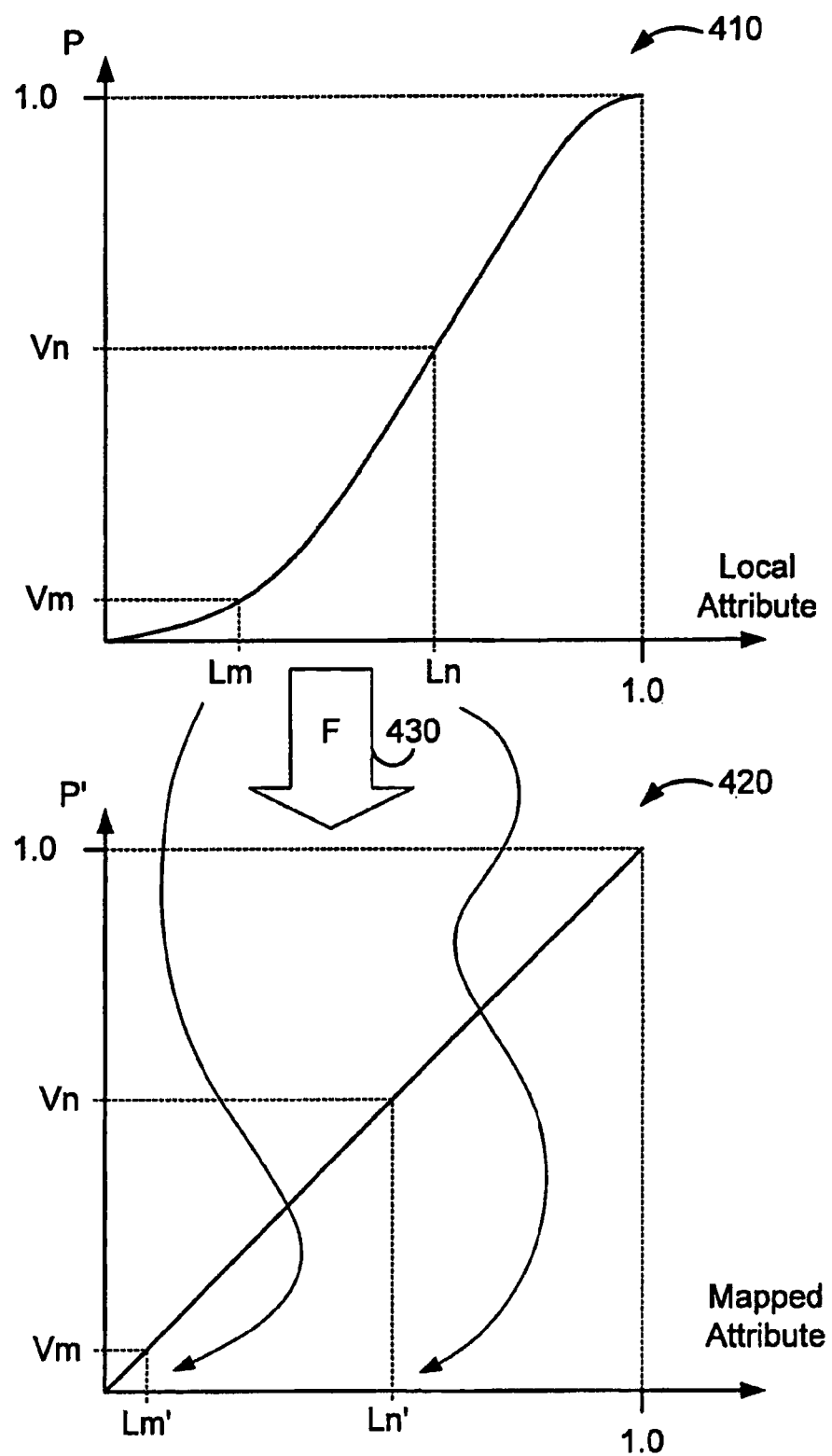

DETERMINING PARAMETERS FOR ADJUSTING IMAGES

CROSS-REFERENCE TO RELATED APPLICATION

The present application is a continuation of U.S. patent application Ser. No. 10/678,423, filed Oct. 3, 2003, which is incorporated herein by reference in their entirely.

BACKGROUND

The present invention relates to image processing.

An electronic image, such as a digital image, can be represented by an array of closely packed pixels that are basic picture elements. Each pixel represents a local portion of the image and alone or together with other pixels, determines graphical attributes for the local portion. The graphical attributes can include color, gray-level, luminosity or transparency. Electronic images can be generated by graphical software applications or electronic devices such as scanners or digital cameras. The graphical software applications include presentation, animation, painting and design applications. The generated image can be further processed by the same or another device or application. During image processing, graphical attributes can be adjusted at the pixels of the image to achieve various visual effects that include adjustments to brightness, contrast or color.

SUMMARY

One or more adjustment parameters are determined for adjusting an image based on values of a graphical attribute in the image and an adjustment mapping for the graphical attribute, where the adjustment mapping is based on the adjustment of the image and depends upon the adjustment parameters. In general in one aspect, the invention provides methods and apparatus, including computer program products, for determining parameter values for adjusting an image. A first function of a local attribute is specified based on values of the local attribute in the image. A second function of the local attribute is specified based on an image adjustment depending upon an adjustment parameter. An object function value is calculated for each of two or more values of the adjustment parameter, each object function value including accumulated differences between the first and second function at multiple values of the local attribute. Based on the calculated object function values, a value of the adjustment parameter is determined for adjusting the image.

Particular implementations can include one or more of the following features. Specifying the first function of the local attribute can include specifying the first function based on modified values of the local attribute generated by another image adjustment when applied to the image. Specifying the first function of the local attribute can include specifying the first function based on a cumulative distribution of the values of the local attribute in the image. The cumulative distribution can be specified based on a density histogram generated by binning values of the local attribute in the image into predetermined intervals. The cumulative distribution can be a contrast-constrained cumulative distribution.

Specifying the second function of the local attribute can include specifying an attribute mapping for the local attribute based on the image adjustment, where the attribute mapping depends on the adjustment parameter. The attribute mapping can be specified by a non-local function depending, for each location within the image, on a neighborhood intensity characterizing pixel values in a neighborhood surrounding the location. Specifying the second function of the local attribute includes, for each location within the image, substituting the corresponding neighborhood intensity with a pixel value at the location. Specifying the second function of the local attribute can include specifying a composite function of the local attribute based on the attribute mapping and a non-linear function defining a desired distribution for the local attribute. The desired distribution corresponds to a gaussian density of the local attribute.

Calculating the object function values can include accumulating differences between a center value of the local attribute and values of the second function at the plurality of values of the local attribute. The accumulated differences between the first and second functions can be combined with the accumulated differences between the center value and the second function. Calculating the object function values can include accumulating differences between the first and second function according to a functional weight that depends on the value of the local attribute. Calculating the object function values can include accumulating squared differences between the first and second function at the plurality of values of the local attribute.

Determining the value of the adjustment parameter for adjusting the image can include finding an adjustment parameter value for which the object function value is minimal. The image can be adjusted using the image adjustment with the determined value of the adjustment parameter. The local attribute depends on luminosity or a color value. The image adjustment can include separate tone adjustments for different tones. The tone adjustments can include a shadow adjustment and a highlight adjustment.

The invention can be implemented to realize one or more of the following advantages. Parameters can be determined automatically for image adjustments. For example, adjustment parameters can be determined for correcting a digital image with lighting problems, such as underexposure, overexposure, backlit subjects or oversaturated highlights. Since these parameters are determined automatically by the invention, these image problems can be corrected without requiring a user to manually set the adjustment parameters for the particular image. Thus the user can initiate the image correction by a single press of a button. For users who desire more control, the user interface provides dialog boxes or sliders to alter the parameters for the adjustment. In the user interface, the adjustment parameters can be initialized to the automatically determined values for easy variations around an optimized setting. In addition to the software applications themselves, the automatic parameter selection can be incorporated into software or hardware of image capturing devices, such as digital cameras, scanning and faxing devices that generate electronic images, or portable display devices, such as portable digital assistants or mobile phones that display electronic images. By incorporating the automatic parameter selection, such devices can automatically produce lighting corrected images. To adjust an image, a simple fully automatic technique can be combined with a more complex technique that requires setting one or more parameters. The two techniques can be combined to adjust an image with a new automatic technique that does not produce artifacts, noise, too much contrast or undesirable colors in the adjusted image.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 4 is a schematic diagram illustrating exemplary distributions used for determining parameters for adjusting an image.

Like reference numbers and designations in the various drawings indicate like elements.

DETAILED DESCRIPTION

Figure 1:
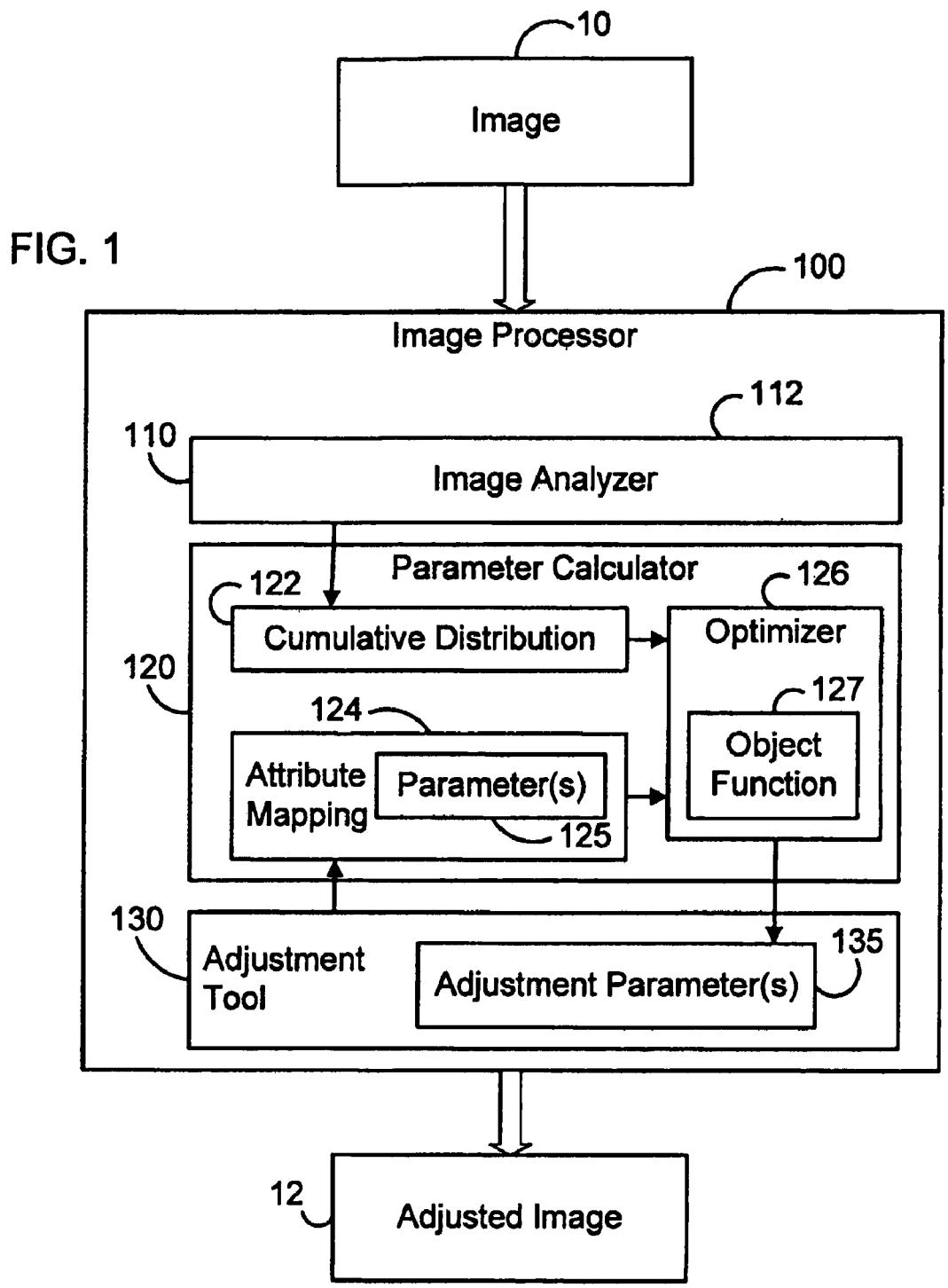
FIG. 1 is a schematic diagram illustrating an image processor with automatic determination of parameters for adjusting an image.

FIG. 1 illustrates an image processor 100 that automatically determines parameter values for adjusting an electronic image 10. Using the determined parameter values, the image processor 100 adjusts graphical attributes in the image 10 to generate an adjusted image 12. The adjusted graphical attributes include pixel attributes that specify color, graylevel, luminance, saturation or transparency. The image 10 can be a digital image in which pixel attributes are specified by numerical values in a bitmap. For digital images, the image processor 100 can be implemented in one or more software applications or as a plug-in to a software application. Alternatively, the received image can be specified by analog electronic signals in electronic devices such as cameras and scanners. The image processor 100 can digitize the analog signals before processing the image 10. Alternatively, the image processor 100 can be implemented by analog data processing apparatus to process the analog signals of the image 10.

The image processor 100 includes an image analyzer 110, a parameter calculator 120 and an adjustment tool 130, such as a local adjustment tool for tone selective adjustment described in U.S. patent application Ser. No. 10/678,366, filed on Oct. 3, 2003, entitled SELECTIVE ADJUSTMENT OF IMAGES the entire disclosure of which is hereby incorporated by reference in its entirety. The image analyzer 110 analyzes the image 10 and provides results of the analysis to the parameter calculator 120. Based on the analysis, the parameter calculator 120 determines parameters for the adjustment tool 130 to adjust the image 10. The adjustment tool 130 can use the determined parameters directly to adjust the image. Or the adjustment tool 130 can receive user input that modifies the determined parameters, and use the modified parameters to adjust the image 10.

The image analyzer 110 analyzes one or more graphical attributes in the image 10. For example, the image analyzer 110 can collect all values of a local attribute that occur in the image 10. The local attribute can include one or more of color values, luminosity or saturation specified by pixels of the image 10. In one implementation, the image analyzer 110 collects luminosity values ("L") of pixels specifying red ("R"), green ("G") and blue ("B") color values in an RGB color space. For a pixel in RGB color space, luminosity is defined as $L = 0.30R + 0.59G + 0.11B.$ In other color spaces (such as in L*a*b* color space), the pixel explicitly specifies the luminosity value L. In an alternative implementation, a local attribute is specified by a maximum color value ("Vmax") of the pixel (in RGB, Vmax=Maximum[R, G, B]).

Optionally, the image analyzer 110 specifies a density histogram for a local attribute. The density histogram is a binned collection of local attribute values in the image. The density histogram is generated by binning the collected attribute values into predetermined intervals. For each of the intervals, the density histogram specifies how many of the collected values lie within the interval. The predetermined intervals can be obtained by dividing the full range of the local attribute into a predetermined number ("N") of intervals. For example, the full range from zero to one can be uniformly divided into N intervals, where the n-th interval (n=1, . . . , N) corresponds to attribute values between $(n-1)/N$ and $n/N$.

In addition to local attributes, the image analyzer 110 can collect non-local image characteristics, such as neighborhood intensities for tone selective adjustment. For each pixel in the image 10, the image analyzer 110 can calculate a corresponding neighborhood intensity based on a graphical attribute of pixels in a neighborhood. For example, the neighborhood intensity can include an average luminosity or saturation of pixels in the neighborhood.

The parameter calculator 120 includes a cumulative distribution 122, an attribute mapping 124 and an optimizer 126. The cumulative distribution 122 is based on the attribute values collected by the image analyzer 110, and the attribute mapping 124 is based on an adjustment specified by the adjustment tool 130. The cumulative distribution 122 and the attribute mapping 124 are used by the optimizer 126 to generate parameter values for the adjustment tool 130 to adjust the image 10.

The cumulative distribution 122 is a function of a local attribute (such as the luminance L), and characterizes occurrences of different values of the local attribute in the image 10 based on the attribute values collected by the image analyzer 110. For a particular value of the local attribute, the cumulative distribution 122 specifies a corresponding distribution value measuring the fraction of the collected attribute values that are equal or smaller than the particular value. Each distribution value can be an integer that indicates an actual number of collected values that are equal or smaller than the corresponding value of the local attribute. Alternatively, the distribution values can be normalized to lie within a predetermined interval, for example between zero and one.

With distribution values between zero and one, the cumulative distribution 122 corresponds to a probability ("P") for finding attribute values in the image that are equal or smaller than a particular value ("LA") of the local attribute. Accordingly, the probability P(LA) monotonically increases with increasing value LA of the local attribute. At a maximum value ("LAmax") of the local attribute, the probability P is one (P(LAmax)=1). The maximum value Imax can be 255 for an 8-bit color representation, and 32768 for a 16-bit color representation. Or independent of the representation, the local attribute values can be normalized to have a maximum value of one (LAmax=1.0). An exemplary cumulative distribution is illustrated in FIG. 4.

The cumulative distribution 122 can be calculated from the collected attribute values in the image processor 100 by the image analyzer 110 or the parameter calculator 120. To calculate the cumulative distribution 122, the range of local attribute values can be defined by multiple predetermined values of the local attribute, such as N equally spaced values between zero and Imax. For each predetermined value, the image processor specifies a distribution value by calculating how many collected attribute values are equal or smaller than the predetermined value. The cumulative distribution 122 is obtained by associating the predetermined values of the local attribute with the calculated distribution values.

The cumulative distribution 122 can also be calculated from a density histogram generated by the image analyzer 110 collecting pixel values of a local attribute in the image. The density histogram specifies uniform intervals at equally spaced values ("x"). For each interval, a fraction ("p(x)") of the collected attribute values lie in the interval (x, x+dx). For an attribute value LA, the cumulative distribution 122 can specify a distribution value ("P(LA)") from the fractions p(x) that correspond to attribute values of x that are equal to or smaller than LA. That is, $$P(LA)=\text{Integral}(0,LA)dxp(x),$$

where Integral(0, LA) represents summation for values of x that are between zero and LA.

The attribute mapping 124 specifies a mapping for the same local attribute (such as luminosity) that is described by the cumulative distribution 122. The attribute mapping 124 ("F") maps an attribute value ("LA") to a mapped value ("MLA") of the same local attribute (MLA=F(LA)). For example, the attribute mapping 124 can map a luminosity value to a mapped luminosity value, or a color value to a mapped color value.

The attribute mapping 124 is based on an image adjustment that can be performed by the adjustment tool 130. The attribute mapping 124 can be explicitly specified by the adjustment tool 130 or, if no explicit mapping is available, determined by calculating or simulating the effects of applying the image adjustment to the local attribute.

As discussed below with reference to FIG. 3, the parameter calculator 120 can modify (for example, simplify) a mapping specified by the adjustment tool 130 to define the attribute mapping 124.

The attribute mapping 124 depends on one or more parameters 125. The parameters 125 correspond to one or more adjustment parameters of the image adjustment performed by the adjustment tool 130. The parameters 125 can be specified explicitly by the adjustment tool 130. For example, the adjustment tool 130 can include separate tone components to perform shadow and highlight adjustments, and the parameters 125 can include a separate strength parameter for each of the shadow and highlight adjustments. Alternatively, the parameters 125 can include a single parameter for correcting only underexposure (or overexposure), and the strength parameters for the shadow and highlight adjustments can be calculated from the single parameter according to some predetermined rule.

The optimizer 126 uses the cumulative distribution 122 and the attribute mapping 124 of the local attribute to generate an object function 127. The object function 127 is minimized to determine optimal values for the parameters 125. The object function 127 is a function of the parameters 125, and measures a difference between a desired and a mapped distribution of the local attribute in the image. The desired distribution can correspond to luminosity values having a density that is uniform or follows a gaussian (bell curve) or other functional form, depending on esthetic considerations. The mapped distribution represents the distribution of mapped values of the local attribute, where the mapped values are generated by applying the attribute mapping 124 to attribute values characterized by the cumulative distribution 122. Generating and minimizing object functions are discussed in detail with reference to FIGS. 3 and 4.

The adjustment tool 130 uses the parameter values optimized by the parameter calculator 120 to set one or more adjustment parameters 135. The adjustment tool 130 can adjust the image 10 using the optimized values (and optionally some default values) without requesting a user to set any of the parameters 135. Or upon request by a user, the adjustment tool 130 can provide a user interface including dialog boxes or sliders to set one or more of the adjustment parameters 135. In the user interface, one or more of the adjustment parameters 135 can be initialized to the optimized values, which can be altered according to the user's desire to achieve artistic effects.

The adjustment tool 130 can perform one or more adjustments in the image 10. For example, multiple tone components can specify different luminosity adjustments for different tones such as shadow, highlight or midtone. For each tone, the adjustment parameters 135 can include separate adjustment parameters, such as a strength of the tone adjustment or parameters for characterizing the tone in a neighborhood. The adjustment tool 130 can also perform filtering, such as blurring or sharpening, or adjustments to color parameters, such as hue or saturation. Or the adjustment tool 130 can perform adjustments using tone mapping functions as described by J. Tumblin and H. Rushmeier in "Tone Reproduction for Realistic Images," IEEE Computer Graphics and Applications IEEE Computer Graphics and Applications, November 1993, 13(6), 42-48, or by Zia-ur Rahman in "A Multiscale Retinex for Color Rendition and Dynamic Range Compression," SPIE International Symposium on AeroSense, Visual Information Processing IX, April 2000. The adjustment parameters 135 can include parameters corresponding to any of such adjustments.

Figure 2:
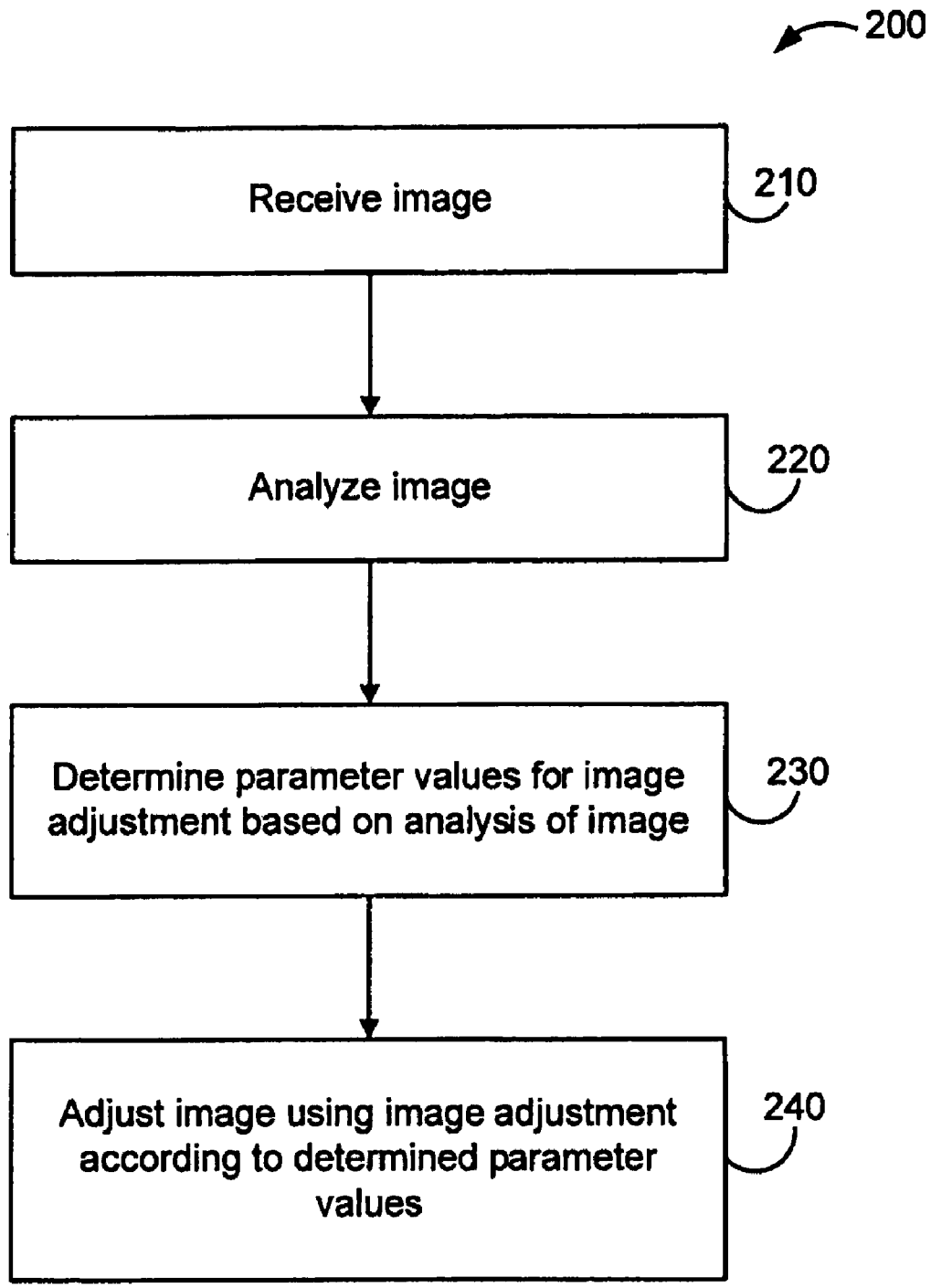
FIGS. 2 and 3 are schematic flow diagrams illustrating methods for adjusting an image.

FIG. 2 illustrates a method 200 for adjusting electronic images. The method 200 can be performed in a system for image processing including the image processor 100 (FIG. 1).

The system receives an electronic image (step 210). The image can be received from an electronic device (such as a scanner or a digital camera), a local storage device (such as a memory unit or a disk drive) or a remote source through a computer network such as the Internet. The received image can be a digital or an analog image. To process the analog image, the system can digitize the image or use analog image processing devices.

The system analyzes the received image (step 220). The system can collect values of a local attribute specified by pixels in the image. The local attribute can be a graphical attribute specified by individual pixels in the image, such as a color, luminance or saturation value or combinations of such pixel values. The local attribute can also include contributions from more than one pixel. For example, a luminance gradient at a location can be based on neighboring pixels of the location. The collected values can be sorted or binned into non-overlapping intervals, such as defined by equally spaced values. Optionally, the system can detect non-local features, such as a neighborhood intensity that is based on pixel values in a neighborhood surrounding a location.

The system determines one or more parameter values for an image adjustment based on the analysis of the image (step 230), and adjusts the image using the image adjustment according to the determined parameter values (step 240). For a local attribute such as luminosity, the system can specify a cumulative distribution based on attribute values collected by the analysis, and an attribute mapping based on the image adjustment. The attribute mapping for the local attribute depends on one or more parameters of the image adjustment, and represents how the image adjustment affects the local attribute. Based on the cumulative distribution and the attribute mapping, the system defines an object function that depends on the parameters of the image adjustment and can be minimized to determine optimal values for these parameters, as discussed below with reference to FIGS. 3 and 4.

Figure 3:
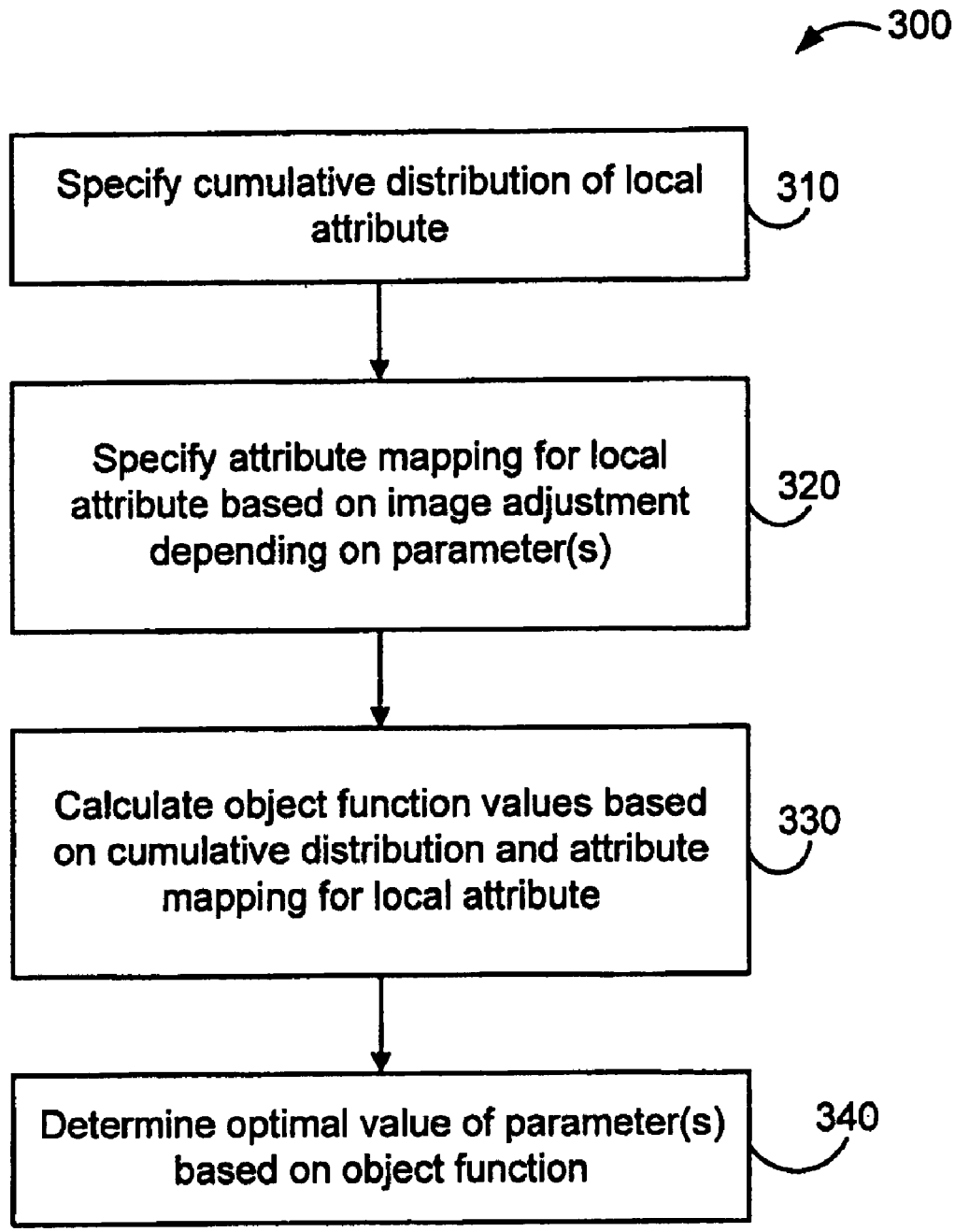

FIG. 3 illustrates a method 300 for determining parameter values for adjusting an image. The method 300 can be performed in a system for image processing including the parameter calculator 120 (FIG. 1).

The system specifies a cumulative distribution of values of a local attribute (step 310). The cumulative distribution can be based on values of the local attribute in the image. Alternatively, cumulative distribution can be based on modified values of the local attribute, where the modified values can correspond to an automatic adjustment of the image. The local attribute is usually a graphical attribute specified by individual pixels in the image, such as a color, luminance or saturation value (or a combination of such pixel values). To determine the cumulative distribution, values of the local attribute are collected by analyzing the image. The cumulative distribution is a function of the local attribute. For a particular value of the local attribute, this function specifies a corresponding distribution value measuring the fraction of the collected attribute values that are equal to or smaller than the particular value. The cumulative distribution can be normalized to have distribution values between zero and one.

In one implementation, the system specifies a cumulative distribution using a linear measure for characterizing fractions of the collected attribute values. With the linear measure, the cumulative distribution has distribution values that are proportional to the number of collected attribute values that are equal to or smaller than the corresponding value of the local attribute. Alternatively, the system can specify a non-linear measure for characterizing fractions of the collected local attribute values, or modify the cumulative distribution specified by the linear measure. For example, contrast in the image can be constrained by specifying a contrast-constrained cumulative distribution as described in Gregory Ward Larson, et al, "A Visibility Matching Tone Reproduction Operator for High Dynamic Range Imagery," 1997, IEEE Transactions on Visualization and Computer Graphics. The contrast-constrained cumulative distributions can be used if less lighting correction is needed in very dark or very light regions.

The system specifies an attribute mapping for the local attribute based on an image adjustment (step 320). The attribute mapping also depends on one or more adjustment parameters of the image adjustment, and maps each value of the local attribute to a mapped value of the local attribute. If the image adjustment explicitly specifies a mapping for the local attribute, the system can use that mapping as the attribute mapping. If there is no such explicit mapping available, the system can calculate the attribute mapping based on how the image adjustment affects the local attribute. Optionally, the system can modify a mapping of the image adjustment to specify the attribute mapping.

The image adjustment can include a color mapping that maps color values at each pixel in the image. The color mapping is specified by a non-local function ("A") that maps a color value ("C" such as a red, green or blue value) to a mapped color value ("MC") depending on one or more adjustment parameter values ("pv") and a neighborhood intensity ("NI") that is based on luminosity of pixels in a neighborhood surrounding the location:

$$MC = A(C, NI, pv).$$

To specify an attribute mapping for a color value C, the system can apply the non-local function A directly to pixel values in the image. Thus the attribute mapping for color can be defined by a function ("FC") providing a mapped color value ("MC") as $$MC = FC(C, pv; NI) = A(C, NI, pv).$$

Or an attribute mapping can be defined for a luminosity (L) by a function ("$FL_1$") that is obtained by applying the non-local function A to each color value of red ("R"), green ("G") and blue ("B") and combine the mapped color values to obtain a mapped luminosity ("ML") as $$ML = FL_1(L, pv; NI) = 0.3FC(R, pv; NI) + 0.59FC(G, pv; NI) + 0.11FC(B, pv; NI).$$

Alternatively, the function FC can be modified to define another function ("$FL_2$") for luminosity mapping by replacing the color value C with a luminance value L as $$ML = FL_2(L, pv; NI) = A(L, NI, pv).$$

The functions FC, FL1 and FL2 are non-local functions that, in addition to a local attribute value, also depend on a corresponding neighborhood intensity NI, which can be different at different locations in the image. To use these functions, the system collects the neighborhood intensities in addition to the corresponding attribute values in the image, and uses both the attribute values and the corresponding neighborhood intensities to obtain mapped attribute values. Alternatively, these functions can be directly applied to the image each time mapped attribute values are evaluated.

For specifying the attribute mapping, the non-local function A can be simplified into a local function by replacing the non-local variable NI corresponding to a location by a default value or a local attribute ("LA") at the location. For example, the luminosity L at the location can be used instead of the neighborhood intensity NI that characterizes luminosity in the neighborhood surrounding the location. Thus the function $FL_2$ for luminance mapping can be further simplified to define another function ("F") for mapping a value of the local attribute to a mapped value ("MLA") as $$MLA = F(LA, pv) = A(LA, LA, pv).$$

The local attribute LA can also depend on other local attributes, such as color saturation.

The system calculates values of an object function based on the specified cumulative distribution and the attribute mapping for the local attribute (step 330). The object function is a function of the parameters of the attribute mapping. The object function compares two functions that can be defined to measure a difference between a desired and a mapped distribution. The desired distribution can correspond to attribute values having a uniform, gaussian or other predetermined density function. Defining object functions for different desired distributions is discussed in detail with reference to FIG. 4.

For a desired distribution with a uniform density function, the object function compares the specified cumulative distribution ("P") and the attribute mapping ("F") for the local attribute ("LA"). For the comparison, the cumulative distribution P and the attribute mapping F are normalized to have a common range of attribute and function values, such as between zero and one for both attribute and function values. The object function can be defined as a non-negative function that has a minimum value of zero when the cumulative function P and the attribute mapping F have the same functional form.

For example, an object function $OF_1$ can be defined by an integrating a squared difference between P and F over all attribute values LA between 0 and 1 as $$OF_1(pv) = \text{Integral}(0,1) dLA [P(LA) - F(LA, pv)]^2.$$

Another object function $OF_2$ can be defined by an integral using a non-negative functional weight ("MU") as $$OF_2(pv) = \text{Integral}(0,1) dLA\, MU(LA)[P(LA) - F(LA,pv)]^2.$$

The functional weight MU depends on the local attribute value according to some functional form that can be selected to achieve some effects. To give more weight in the object function to larger attribute values (such as bright pixels), the functional weight MU can have a linear form, such as MU(LA)=LA). To give more weight in the object function to attribute values that are more heavily represented in the image, the functional weight can be proportional to a density histogram ("p") that represents attribute values in the image binned into uniform intervals of size dLA. (The density histogram p is proportional to the derivative of the cumulative distribution P.) Or the functional weight MU can be proportional to a power ("b") of the density histogram (MU(LA)=p(LA)^b). Powers that are less than one increase weight of the highly populated bins of the local attribute; powers that are greater than one increase weight of the less populated bins.

In addition to a term that compares P and F, the object function can include additional terms to achieve particular effects. To center attribute values (LA) around the middle (½) of the full range specified for the local attribute, an additional term ("AT") can have the form of $$AT(pv) = \text{Integral}(0,1) dLA [1/2 - F(LA, pv)]^2,$$

and an object function $OF_3$ can be defined using a mix-in parameter ("M") as $$OF_3(pv) = OF_1(pv) + M\, AT(pv).$$

The mix-in parameter M is a constant that represents the importance of centering the attribute values. For example, the mix-in parameter M can be about 0.5.

The system determines optimal values for one or more adjustment parameters based on the object function (step 340). The system can minimize the object function to determine optimal values for the adjustment parameters. In one implementation, the system generates multiple values of one or more adjustment parameters, evaluates the object function for all variations of the generated parameter values, and selects the parameter values for which the object function has a minimum for the generated parameter values.

The system can simultaneously optimize two parameters, such as adjustment strengths for both shadow and highlight adjustments in tone selective image adjustment. The adjustment strengths for shadow and highlight control the degree of shadow brightening and highlight darkening, respectively. When twenty different values are generated for each of the shadow and highlight strengths, a pair of optimal shadow and highlight strength values can be selected from four hundred combinations based on the corresponding object function values. While strength parameters are optimized, other parameters can have default values for the shadow/highlight adjustment. Optionally, one or more of such other parameters can be optimized in a following step that uses the already optimized strength parameter values. A large number of parameters can be optimized in a sequence of optimizing steps, where each step optimizes a few (one or two) parameters with optimal values set for previously optimized parameters. Optionally, the same parameters can be optimized multiple times.

The system can use any other optimization technique to find optimal values for the adjustment parameters. For example, the optimizer can use non-linear optimization techniques such as optimization based on gradient descent. Non-linear optimization techniques can also be used to refine coarse-grained values obtained by simpler techniques. Optimal values may be found by explicit mathematical formulas derived from an analytical solution for minimizing the object function.

FIG. 4 illustrates exemplary distributions 410 and 420 and an attribute mapping 430. The distribution 410 represents a cumulative distribution P of a local attribute, such as a color value or a luminosity of pixels in an image. The distribution 420 is a mapped distribution P' for mapped attribute values that are generated by applying the attribute mapping 430 ("F") to attribute values having the cumulative distribution P. The distribution P' corresponds to evenly distributed mapped attribute values, which can be a desired distribution for maximizing contrast in the image.

Relations between the cumulative distribution P and mapped distribution P' are illustrated using two exemplary attribute values Lm and Ln. For the attribute values Lm and Ln, the cumulative distribution P specifies distribution values Vm and Vn. The distribution value Vm is proportional to the number of attribute values in the image that are equal or smaller than Lm, and the distribution value Vn is proportional to the number of attribute values in the image that are equal or smaller than Ln.

The attribute mapping F maps the local attribute values Lm and Ln to mapped attributes values Lm'=F(Lm) and Ln'=F(Ln), respectively. The attribute mapping F is a monotone mapping that maintains the ordering of the attribute values. Thus Lm' is smaller than Ln' because Lm is smaller than Ln. The mapping F being monotone, the same distribution value Vn is specified in the cumulative distribution P and the mapped distribution P' when the attribute value Ln is mapped to the mapped attribute value Ln'. Similarly, Vm is not changed by mapping Lm to Lm'. This relation holds for any attribute value LA mapped to LA'=F(LA) as $$V = P(LA) = P'(LA') = P'(F(LA)).$$

According to this formula, the mapped distribution is linear, P'(LA')=LA'=F(LA), when the attribute mapping F(LA) is the same as the cumulative distribution P(LA). Therefore, a desired linear mapped distribution P' may be obtained by minimizing differences between P(LA) and F(LA), as discussed above with reference to FIG. 3. The mapped distribution P' can have a desired non-linear functional form ("DP"), P'(LA')=DP(LA')=DP(F(LA)), when the composite function DP(F(LA)) is the same as the cumulative distribution P(LA). Accordingly, the desired distribution DP may be obtained by minimizing differences between P(LA) and DP(F(LA)). To minimize the differences, an object function ("$OF_{DP}$") can be defined as, $$OF_{DP}(pv) = \text{Integral}(0,1) dLA [P(LA) - DP(F(LA, pv))]^2.$$

Similar to the uniform case discussed above with reference to FIG. 3, an object function can be defined with additional terms or integrals with functional weight.

A desired non-linear distribution may correspond to a gaussian density, which is often pleasing to the eye. The cumulative distribution for the gaussian density is the complementary error function that can be approximated using a sigmoid function, $$S(x) = 1/[1 + \exp(-x)].$$

With the sigmoid function S, the desired distribution function DP can be expressed as $$DP(LA') = [S(g(LA' - 1/2LA\max)) - S(-g/2LA\max)] / [S(g/2LA\max) - S(-g/2LA\max)],$$

where LAmax is a maximum value of the local attribute, and g is a gain parameter that corresponds to a width of the corresponding gaussian density distribution. For example, g can have a value of about 2.0.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the Post-Script® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A method for determining a value of an adjustment parameter for adjusting an image, the method comprising:
    specifying a first function of a local attribute based on values of the local attribute in the image;
    specifying a second function of the local attribute and the adjustment parameter;
    calculating an object function value, with one or more programmable processors for each of two or more test values of the adjustment parameter, where calculating an object function value for each test value comprises:
        evaluating the first function and the second function at a plurality of values of the local attribute, where evaluating the second function includes using the test value;
        accumulating differences between the first and second function at the plurality of values of the local attribute according to a functional weight that depends on the value of the local attribute;
    based on the calculated object function values and at least one of the two or more test values, determining the value of the adjustment parameter for adjusting the image and storing the value in a memory.

2. The method of claim 1, wherein:
    specifying the first function of the local attribute includes specifying the first function based on modified values of the local attribute generated by another image adjustment when applied to the image.

3. The method of claim 1, wherein:
    specifying the first function of the local attribute includes specifying the first function based on a cumulative distribution of the values of the local attribute in the image.

4. The method of claim 3, further comprising:
    specifying the cumulative distribution based on a density histogram generated by binning values of the local attribute in the image into predetermined intervals.

5. The method of claim 3, wherein:
    the cumulative distribution is a contrast-constrained cumulative distribution.

6. The method of claim 1, wherein:
    specifying the second function of the local attribute includes specifying an attribute mapping for the local attribute based on an image adjustment, the attribute mapping depending on the adjustment parameter.

7. The method of claim 6, wherein the attribute mapping is specified by a non-local function depending, for each location within the image, on a neighborhood intensity characterizing pixel values in a neighborhood surrounding the location.

8. The method of claim 7, wherein:
specifying the second function of the local attribute includes, for each location within the image, substituting the corresponding neighborhood intensity with a pixel value at the location.

9. The method of claim 6, wherein:
specifying the second function of the local attribute includes specifying a composite function of the local attribute based on the attribute mapping and a non-linear function defining a desired distribution for the local attribute.

10. The method of claim 9, wherein the desired distribution corresponds to a gaussian density of the local attribute.

11. The method of claim 1, wherein calculating the object function values includes:
accumulating differences between a center value of the local attribute and values of the second function at the plurality of values of the local attribute; and
combining the accumulated differences between the first and second functions with the accumulated differences between the center value and the second function.

12. The method of claim 1, wherein:
calculating the object function values includes accumulating squared differences between the first and second function at the plurality of values of the local attribute.

13. The method of claim 1, wherein:
determining the value of the adjustment parameter for adjusting the image includes finding an adjustment parameter value for which the object function value is minimal.

14. The method of claim 1, further comprising:
adjusting the image using the value of the adjustment parameter.

15. The method of claim 1, wherein the local attribute depends on luminosity.

16. The method of claim 1, wherein the local attribute depends on a color value.

17. The method of claim 14, wherein adjusting the image includes separate tone adjustments for different tones.

18. The method of claim 17, wherein the tone adjustments include a shadow adjustment and a highlight adjustment.

19. The method of claim 1, wherein the step of calculating an object function value is performed by an image processor of a system for image processing.

* * * * *